United States Patent
Saripalli

(10) Patent No.: US 7,707,383 B2
(45) Date of Patent: Apr. 27, 2010

(54) ADDRESS TRANSLATION PERFORMANCE IN VIRTUALIZED ENVIRONMENTS

(75) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 310 days.

(21) Appl. No.: 11/602,715

(22) Filed: Nov. 21, 2006

(65) Prior Publication Data

US 2008/0120487 A1 May 22, 2008

(51) Int. Cl.
*G06F 12/00* (2006.01)
(52) U.S. Cl. .............................. 711/203; 711/202; 710/4
(58) Field of Classification Search ................. 711/203, 711/202; 710/4
See application file for complete search history.

(56) References Cited

U.S. PATENT DOCUMENTS

| | | | | |
|---|---|---|---|---|
| 5,123,101 | A * | 6/1992 | Sindhu | 711/207 |
| 5,526,509 | A * | 6/1996 | Doi et al. | 711/122 |
| 5,592,625 | A * | 1/1997 | Sandberg | 711/147 |
| 5,603,008 | A * | 2/1997 | Hilton et al. | 711/164 |
| 5,890,220 | A | 3/1999 | Mochida et al. | |
| 6,009,488 | A * | 12/1999 | Kavipurapu | 710/105 |
| 6,816,469 | B1 * | 11/2004 | Kung et al. | 370/260 |
| 6,886,085 | B1 | 4/2005 | Shuf et al. | |
| 7,389,400 | B2 | 6/2008 | Corrigan et al. | |
| 7,447,867 | B2 * | 11/2008 | Soja et al. | 711/202 |
| 2002/0024954 | A1* | 2/2002 | Cunetto et al. | 370/395.2 |
| 2005/0149562 | A1 | 7/2005 | Browne et al. | |
| 2007/0143565 | A1 | 6/2007 | Corrigan et al. | |

FOREIGN PATENT DOCUMENTS

| | | |
|---|---|---|
| WO | 2006/041471 A2 | 4/2006 |
| WO | 2007/002425 A1 | 1/2007 |
| WO | 2009/045884 A2 | 4/2009 |

OTHER PUBLICATIONS

"PCI Express Enhances Performance in Ethernet Networks", *Technology@Intel Magazine*. (Nov. 2005), 9 pgs.
"PCI Express Ethernet Networking", *Intel PRO Network Adapters*, (Sep. 2005), 6 pgs.
Abramson, Darren , et al., "Intel Virtualization Technology for Directed I/O", *Intel Technology Journal*, vol. 10, Issue 03, ISSN 1535-864X, DOI: 10.535/itj.1003, (Aug. 10, 2006), 16 pgs.
International Search Report/Written Opinion received for PCT Patent Application No. PCT/US2008/077819, mailed on May 14, 2009, 11 pages.
"IA-32 Intel Architecture Software Developer's Manual", Intel, vol. 3, System Programming Guide, Order No. 245472, 2001, pp. 3-26, 3-35 and 3-36.
Office Action received for German Patent Application No. 102008048421.0-53, mailed on Jun. 10, 2009, 3 pages of Office Action and 4 pages of English Translation.
Wagh et al., U.S. Appl. No. 11/906,176, filed Sep. 28, 2007, entitled "Address Translation Caching and I/O Cache Performance Improvement in Virtualized Environments".

* cited by examiner

*Primary Examiner*—Christian P Chace
*Assistant Examiner*—Hashem Farrokh
(74) *Attorney, Agent, or Firm*—Caven & Aghevli LLC

(57) ABSTRACT

Methods and apparatus to improve address translation performance in virtualized environments are described. In one embodiment, a switching logic may translate a virtual address of a memory access request (e.g., transmitted by a transmitting agent and directed to a receiving agent) into a corresponding physical address. Other embodiments are also disclosed.

23 Claims, 5 Drawing Sheets

ADDRESS TRANSLATION PERFORMANCE IN VIRTUALIZED ENVIRONMENTS

BACKGROUND

The present disclosure generally relates to the field of electronics. More particularly, an embodiment of the invention relates to techniques for improving address translation performance in virtualized environments.

Input/output (I/O) virtualization is a technology being developed to ensure that I/O devices function properly in a virtualized environment. For example, when an I/O device issues a direct memory access (DMA) request in a virtualized environment (for example, where there may be more than one operating system (OS) executing in the system), a translation may be performed on the address specified by the DMA request to ensure that the DMA operation and resulting effects are committed to the OS that corresponds to the I/O device.

The ATS (Address Translation Services) specification (e.g., draft revision 0.9, October 2006) seeks to mitigate the affects of address translation by offloading the address translation function to a peripheral component interconnect (PCI) express (PCIe) device (which may operate in accordance with PCIe Specification, Revision 2.0, October 2006). For example, the PCIe device may request an address translation and cache the translation data within a local cache to enable later use of the cached data for faster I/O DMA operations. ATS, however, may generate a substantial amount of traffic on a PCIe bus which may overwhelm the PCIe bus, resulting in degraded performance. Performance may be even more degraded as data transfer rates increase or as the number of address translation requests increases.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may improve address translation performance in virtualized environments. In one embodiment, a switching logic coupled between a transmitting agent (e.g., one or more peripheral devices) and a receiving agent (e.g., an interface device or a chipset) may decode a memory access request (e.g., a DMA request). If the memory access request includes a virtual address (also referred to as a "translated" address), the switching logic may translate the virtual address into the corresponding physical address (also referred to as an "untranslated" address) to provide an updated memory access request. In one embodiment, the switching logic may transmit the updated memory access request to the receiving agent after replacing the virtual address with the corresponding physical address. Furthermore, some of the techniques may be utilized in various types of computing environments, such as those discussed with reference to FIGS. 1-5.

Figure 1:
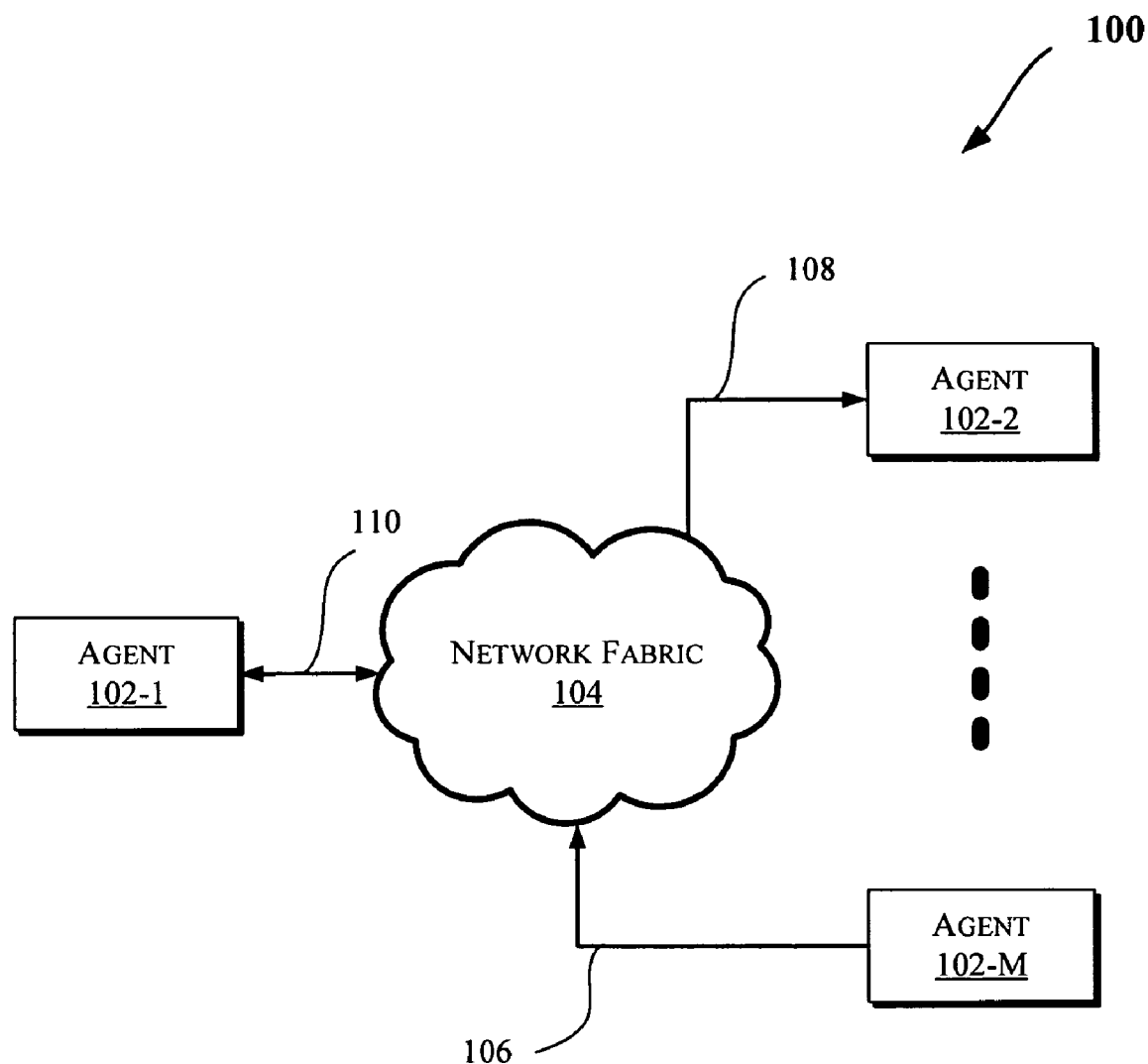
FIGS. 1-3 and 5 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIG. 2, 3, or 5.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
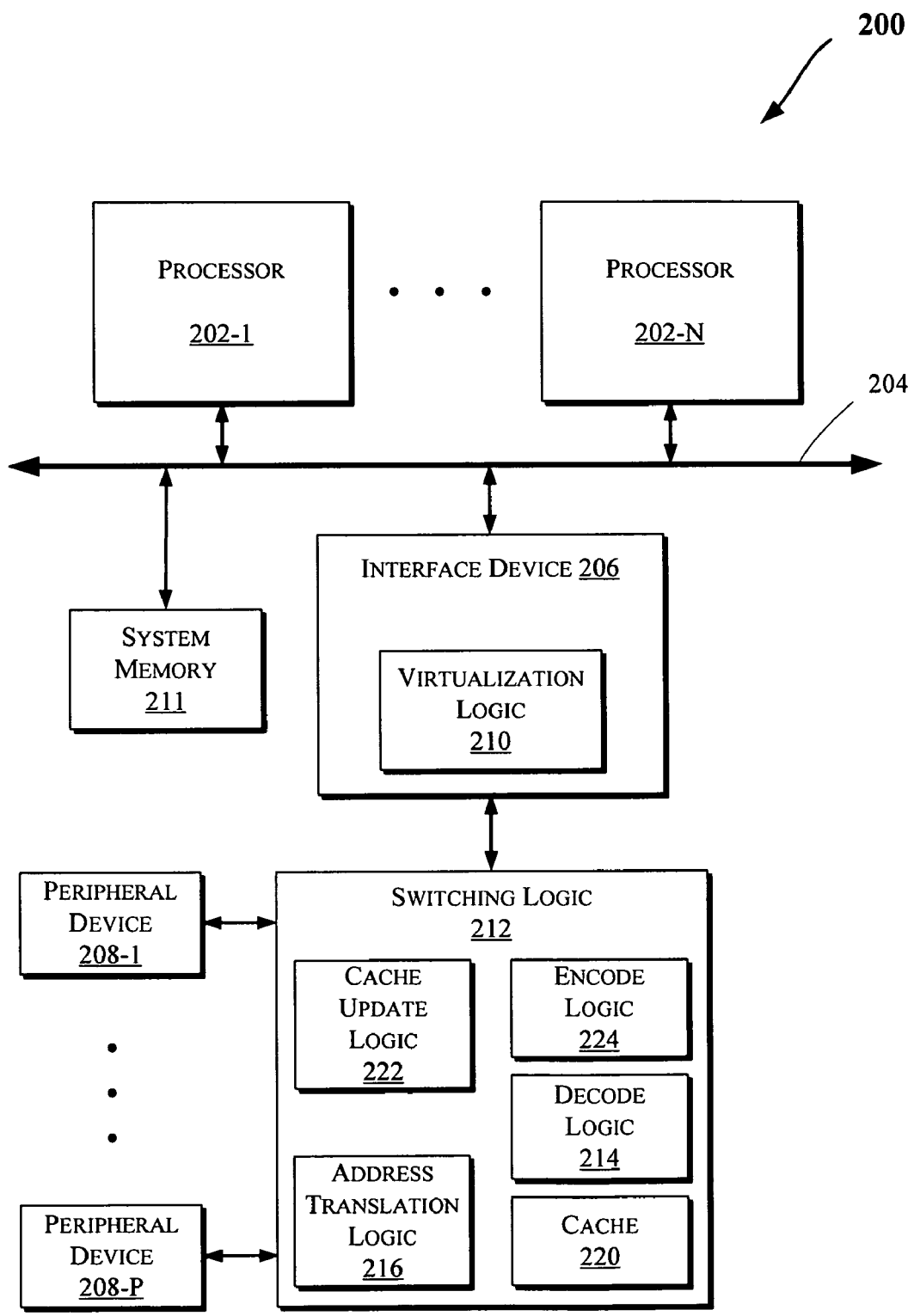

FIG. 2 illustrates a block diagram of portions of a computing system 200, according to an embodiment. In one embodiment, various components of the system 200 may be implemented by one of the agents 102-1 and/or 102-M discussed with reference to FIG. 1. Further details regarding some of the operation of the computing system 200 will be discussed herein with reference to FIG. 4.

The system 200 may include one or more processors 202-1 through 202-N (collectively referred to herein as "processors 202" or more generally "processor 202"). Each of the processors 202-1 through 202-N may include various components, such as private or shared cache(s), execution unit(s), one or more cores, etc. Moreover, the processors 202 may communicate through a bus 204 with other components such as an interface device 206. In an embodiment, the interface device 206 may be a chipset or a memory controller hub (MCH). Moreover, as will be further discussed with reference to FIG. 5, the processors 202 may communicate via a point-to-point (PtP) connection with other components. Additionally, the interface device 206 may communicate with one or more peripheral devices 208-1 through 208-P (collectively referred to herein as "peripheral devices 208" or more generally "device 208"). The devices 208 may be a peripheral device that communicates in accordance with the PCIe specification in an embodiment.

As shown in FIG. 2, the interface device 206 may include a virtualization logic 210. The logic 210 may perform address translation operations for virtualized environments, such as translating virtual addresses into physical addresses. The physical addresses may correspond to locations (e.g., entries) with a system memory 211. The logic 210 may additionally perform other operations such as those discussed with reference to FIGS. 3 and 4 which may cause updating of address translation data in various locations. Also, the virtualization logic 210 may be a root complex in accordance with the PCIe specification.

Furthermore, a switching logic 212 may be coupled between a variety of agents (e.g., peripheral devices 208 and the interface device 206). The switching logic 212 may include a decode logic 214 to decode memory access requests transmitted between the device 206 and one or more of the devices 208. For example, the logic 214 may determine and/or extract a virtual address provided in a memory access request. An address translation logic 216 may translate the virtual address into a corresponding physical address, e.g., by accessing a cache 220. Hence the cache 220 may store data address translation data that may be updated by a cache update logic 222, as will be further discussed with reference to FIG. 4. Moreover, an encode logic 224 may replace the virtual address with the corresponding physical address (as determined by the logic 216) to provide an updated memory access request. The switching logic 212 (e.g., via the logic 224) may transmit the updated memory access request to the interface device 206. Hence, in some embodiments, the switching logic 212 may perform address translation operations before a memory access request containing a virtual address is forwarded to the interface device 206 and processed by the virtualization logic 210. Such embodiments may allow for a more efficient address translation mechanism that reduces potential traffic on a PCI bus (e.g., a PCIe bus) that may couple the devices 208 and the interface device 206.

Figure 3:
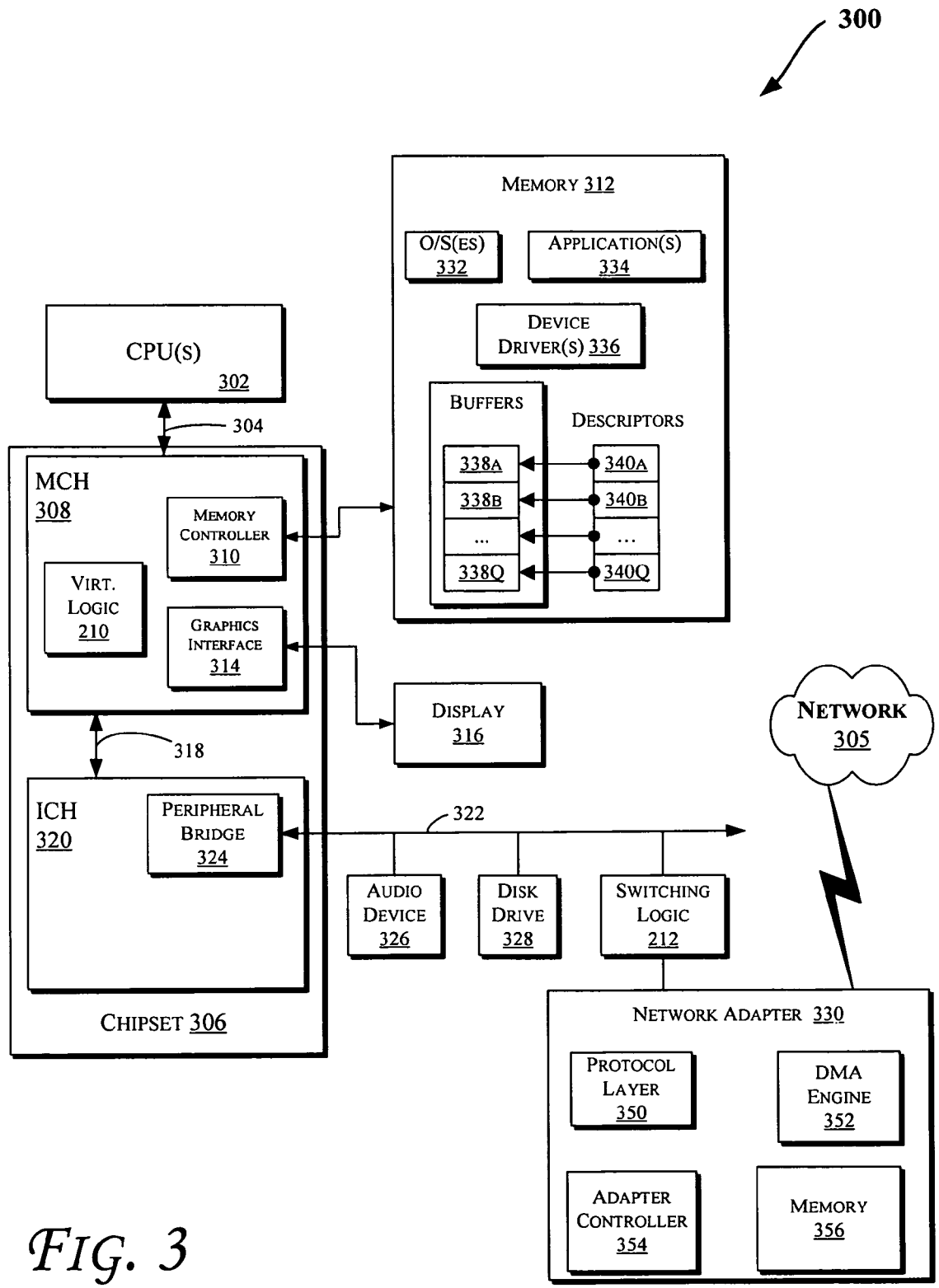

FIG. 3 illustrates a block diagram of an embodiment of a computing system 300. One or more of the agents 102 of FIG. 1 and/or the system 200 of FIG. 2 may comprise one or more components of the computing system 300. The computing system 300 may include one or more central processing unit(s) (CPUs) 302 (which may be collectively referred to herein as "processors 302" or more generically "processor 302") coupled to an interconnection network (or bus) 304. The processors 302 may be any type of processor such as a general purpose processor, a network processor (which may process data communicated over a computer network 305), etc. (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

The processor 302 may include one or more caches (not shown), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 3 (L2) cache, a level 3 (L-3), a mid-level cache, a last level cache (LLC), etc. to store electronic data (e.g., including instructions) that is utilized by one or more components of the system 300.

A chipset 306 may additionally be coupled to the interconnection network 304. In an embodiment, the chipset 306 may be the same as or similar to the interface device 206 of FIG. 2. Further, the chipset 306 may include a memory control hub (MCH) 308. The MCH 308 may include a memory controller 310 that is coupled to a memory 312. The memory 312 may store data, e.g., including sequences of instructions that are executed by the processor 302, or any other device in communication with components of the computing system 300. In an embodiment, the memory 312 may be the same or similar to the memory 211 of FIG. 2. Also, in one embodiment of the invention, the memory 312 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 304, such as multiple processors and/or multiple system memories.

The MCH 308 may further include a graphics interface 314 coupled to a display device 316 (e.g., via a graphics accelerator in an embodiment). In one embodiment, the graphics interface 314 may be coupled to the display device 316 via an accelerated graphics port (AGP). In an embodiment of the invention, the display device 316 (such as a flat panel display) may be coupled to the graphics interface 314 through, for example, a signal converter that translates a digital representation of an image stored in a storage device such as video memory or system memory (e.g., memory 312) into display signals that are interpreted and displayed by the display 316.

As shown in FIG. 3, a hub interface 318 may couple the MCH 308 to an input/output control hub (ICH) 320. The ICH 320 may provide an interface to input/output (I/O) devices coupled to the computing system 300. The ICH 320 may be coupled to a bus 322 through a peripheral bridge (or controller) 324, such as a peripheral component interconnect (PCI) bridge that may be compliant with the PCIe specification, a universal serial bus (USB) controller, etc. The bridge 324 may provide a data path between the processor 302 and peripheral devices. Other types of topologies may be utilized. Also, multiple buses may be coupled to the ICH 320, e.g., through multiple bridges or controllers. For example, the bus 322 may comply with the PCI Local Bus Specification, Revision 3.0, Mar. 9, 2004, available from the PCI Special Interest Group, Portland, Oreg., U.S.A. (hereinafter referred to as a "PCI bus"). Alternatively, the bus 322 may comprise a bus that complies with the PCI-X Specification Rev. 3.0a, Apr. 23, 2003 (hereinafter referred to as a "PCI-X bus") and/or PCI Express (PCIe) Specifications (PCIe Specification, Revision 1.0a, June 2005), available from the aforesaid PCI Special Interest Group, Portland, Oreg., U.S.A. Further, the bus 322 may comprise other types and configurations of bus systems. Moreover, other peripherals coupled to the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 322 may be coupled to an audio device 326, one or more disk drive(s) 328, and a network adapter 330 (which may be a NIC in an embodiment). In one embodiment, the network adapter 330 or other devices coupled to the bus 322 may communicate with the chipset 306 via the switching logic 212. Other devices may be coupled to the bus 322. Also, various components (such as the network adapter 330) may be coupled to the MCH 308 in some embodiments of the invention. In addition, the processor 302 and the MCH 308 may be combined to form a single chip.

Additionally, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 312 may include one or more of the following in an embodiment: an operating system (O/S) 332, application 334, device driver 336, buffers 338, and/or descriptors 340. For example, a virtual machine (VM) configuration (e.g., implemented through on a virtual machine monitor (VMM) module) may allow the system 300 to operate as multiple computing systems, e.g., each running a separate set of operating systems (332), applications (334), device driver (s) (336), etc. Programs and/or data stored in the memory 312 may be swapped into the disk drive 328 as part of memory management operations. The application(s) 334 may execute (e.g., on the processor(s) 302) to communicate one or more packets with one or more computing devices coupled to the network 305. In an embodiment, a packet may be a sequence of one or more symbols and/or values that may be encoded by one or more electrical signals transmitted from at least one sender to at least on receiver (e.g., over a network such as the network 305). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 305).

In an embodiment, the application 334 may utilize the O/S 332 to communicate with various components of the system 300, e.g., through the device driver 336. Hence, the device driver 336 may include network adapter (330) specific commands to provide a communication interface between the O/S 332 and the network adapter 330, or other I/O devices coupled to the system 300, e.g., via the chipset 306. In an embodiment, the device driver 336 may allocate one or more buffers (338A through 338M) to store I/O data, such as the packet payload. One or more descriptors (340A through 340M) may respectively point to the buffers 338. In an embodiment, one or more of the buffers 338 may be implemented as circular ring buffers. Also, one or more of the buffers 338 may correspond to contiguous memory pages in an embodiment.

In an embodiment, the O/S 332 may include a network protocol stack. A protocol stack generally refers to a set of procedures or programs that may be executed to process packets sent over a network (305), where the packets may conform to a specified protocol. For example, TCP/IP (Transport Control Protocol/Internet Protocol) packets may be processed using a TCP/IP stack. The device driver 336 may indicate the buffers 338 that are to be processed, e.g., via the protocol stack.

As illustrated in FIG. 3, the network adapter 330 may include a (network) protocol layer 350 for implementing the physical communication layer to send and receive network packets to and from remote devices over the network 305. The network 305 may include any type of computer network. The network adapter 330 may further include a direct memory access (DMA) engine 352, which writes packets to buffers (338) assigned to available descriptors (340) to transmit and/or receive data over the network 305. As will be further discussed with reference to FIG. 4, the DMA engine 352 may utilize a virtual address corresponding to a location within the memory 312 (such as the descriptors 340 and/or buffers 338) when constructing a memory access request. Additionally, the network adapter 330 may include a network adapter controller 354, which may include logic (such as one or more programmable processors) to perform adapter related operations. In an embodiment, the adapter controller 354 may be a MAC (media access control) component. The network adapter 330 may further include a memory 356, such as any type of volatile/nonvolatile memory (e.g., including one or more cache(s) and/or other memory types discussed with reference to memory 312). In an embodiment, the memory 356 may include an address translation cache 356 that may store address translation data communicated from the virtualization logic 210 and/or the cache 220 within the switching logic 212. Hence, a cache coherency protocol may be utilized to maintain coherency between the various caches that store address translation data.

Additionally, in one embodiment, the chipset 306 (e.g., within the MCH 308 in an embodiment) may include an I/O translation look-aside buffer (TLB) (not shown) that stores address translation information corresponding to one or more memory access requests (e.g., including read or write accesses to the memory 312). The I/O TLB may be a content addressable memory (CAM) or other types of cache (or memory discussed with reference to memory 312). The I/O TLB may be accessible by the virtualization logic 210 to facilitate translation of virtual addresses into physical addresses.

In one embodiment, a memory access request (e.g., such as a DMA request generated by the DMA engine 352 or other devices coupled to the system 300, for example, via the chipset 306) may be sent to the virtualization logic 210. The logic 210 may determine whether the corresponding I/O TLB includes an entry that corresponds to the received request. Moreover, the logic 210 may be provided in other locations than that shown in FIG. 3. For example, logic 210 may be provided elsewhere in the chipset 306, e.g., within ICH 320. Also, logic 210 may be located elsewhere outside the chipset 306, e.g., provided within the network adapter 330.

Figure 4:
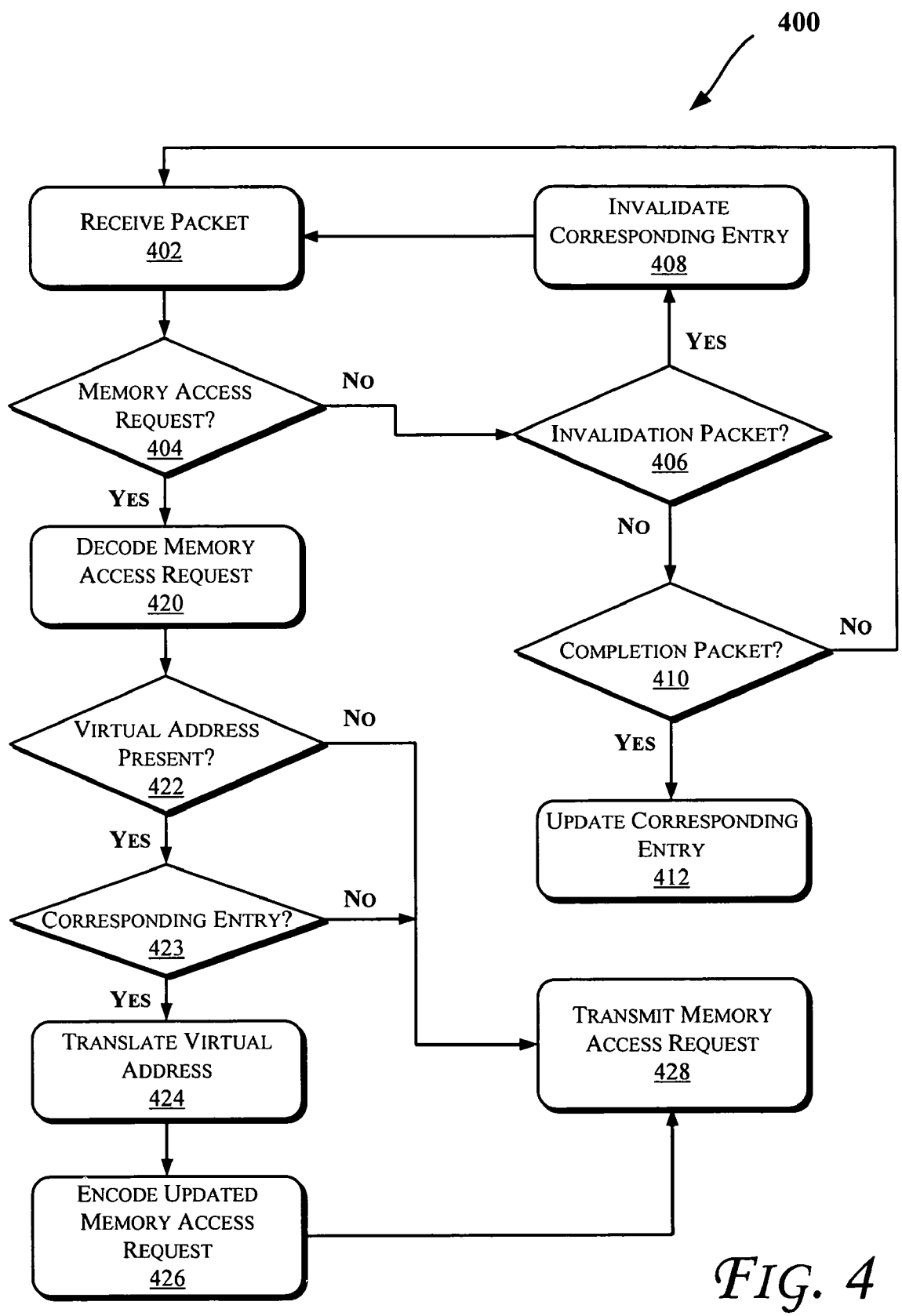
FIG. 4 illustrates a flow diagram of a method according to an embodiment.

FIG. 4 illustrates a flow diagram of a method 400 to maintain and/or utilize a switching logic to improve address translation performance in virtualized environments, according to an embodiment. In one embodiment, various components discussed with reference to FIGS. 1-3 and 5 may be utilized to perform one or more of the operations discussed with reference to FIG. 4.

Referring to FIGS. 1-4, at an operation 402, a packet is received. In one embodiment, the received packet may be a transaction layer packet (TLP). In an embodiment, the received packet may be transmitted by one or more of the agents or peripheral devices discussed with reference to FIGS. 1-3 (such as the agent 102-1, agent 102-M, one or more of the devices 208, and/or network adapter 330). At an operation 404, it is determined whether the received packet is a memory access request (e.g., to read or write data to the memories 211 or 312). In one embodiment, the received packet may include various types of data such as a destination address field (which may include a virtual or a physical address), payload data (e.g., data that is to be written to the memories 211 or 312), and/or an indicia or tag that indicates whether the address field contains a virtual or physical address.

At an operation 406, it is determined whether the received packet is an invalidation packet, e.g., indicating that an entry within a memory unit such as the cache 220 and/or memory 356 (which may include a cache as discussed with reference to FIG. 3) is to be invalidated. In an embodiment, the logic 210 may generate and/or transmit the invalidation packet. If the received packet at operation 402 is determined to be an invalidation packet (for example, as indicated by a tag in the packet), an operation 408 may invalidate the corresponding entry of the memory 356 and/or the cache 220. The method 400 may resume with operation 402 after operation 408.

If operation 406 determines that the received packet is not an invalidation packet, an operation 410 may determine whether the received packet is a completion packet, e.g., a packet that includes completion data sent (e.g., by the virtualization logic 210) in response to a request by an endpoint (e.g., the agent 102-1, agent 102-M, one or more of the devices 208, and/or network adapter 330) to translate one or more virtual addresses into physical addresses. If the packet is a completion packet, an operation 412 may update the corresponding entry (e.g., an entry within the memory 356 and/or the cache 220). Otherwise, the method 400 may return to operation 402. In one embodiment, one or more of the operations 406-412 may be performed by the cache update logic 222.

If operation 404 determines that the received packet is a memory access request (such as a read or write request to the memory 211 and/or 312), an operation 420 may decode the memory access request. An operation 422 may determine whether the memory access request includes a virtual address. In an embodiment, the decode logic 214 may decode the memory access request (420) to determine whether a virtual address is present (422) in the memory access request. For example, the logic 214 may determine whether an indicia or tag present in the memory access request indicates that memory access request is directed to a virtual or physical address.

At an operation 423, it is determined whether an entry corresponding to the virtual address exists in a local storage unit. For example, operation 423 may determine whether the cache 220 includes an entry corresponding to the virtual address. If the cache 220 does include an entry for the decoded virtual address, an operation 424 may translate the virtual address into a corresponding physical address. In an embodiment, the address translation logic 216 may translate the virtual address decoded by the logic 214 by accessing the cache 220 at operation 424.

At an operation 426, the memory access request may be updated such that the virtual address is replaced with the corresponding physical address determined at operation 424. For example, the encode logic 224 may replace the virtual address with the corresponding physical address of the operation 424. In an embodiment, the encode logic 224 may also update a tag or indicia within the memory access request to indicate that the address present in the address field of the memory access request is a physical address. The updated memory access request may be transmitted at an operation 428 to a receiving agent. For example, the switching logic 212 may transmit the updated memory access request to the interface device 206.

In an embodiment, if a virtual address is absent at operation 422, the method 400 may continue with operation 428. Hence, if a memory access request already includes a physical address, no address translation may be performed by the method 400. Also, if a corresponding entry (e.g., in the cache 220) is absent at operation 423, the method 400 may cause the received memory access request to be transmitted to at operation 428 without further changes to the memory access request. In the latter situation, logic within the interface device 206 (e.g., the virtualization logic 210) may perform any requisite address translations for the memory access request.

In some embodiments, the techniques described herein (e.g., with reference to FIGS. 1-4) may reduce the contention that a root complex (e.g., the chipset 306 and/or the interface device 206) would have to deal with for address translation requests by cooperating with a downstream (or embedded) PCIe switch for supporting ATS requests and responses. Furthermore, no support from root complex or software is required to implement some of the embodiments discussed here. For example, by enhancing a PCIe switch (e.g., the switching logic 212), the root complex may be shielded from a large number of hits that would reduce the overall system performance.

Figure 5:
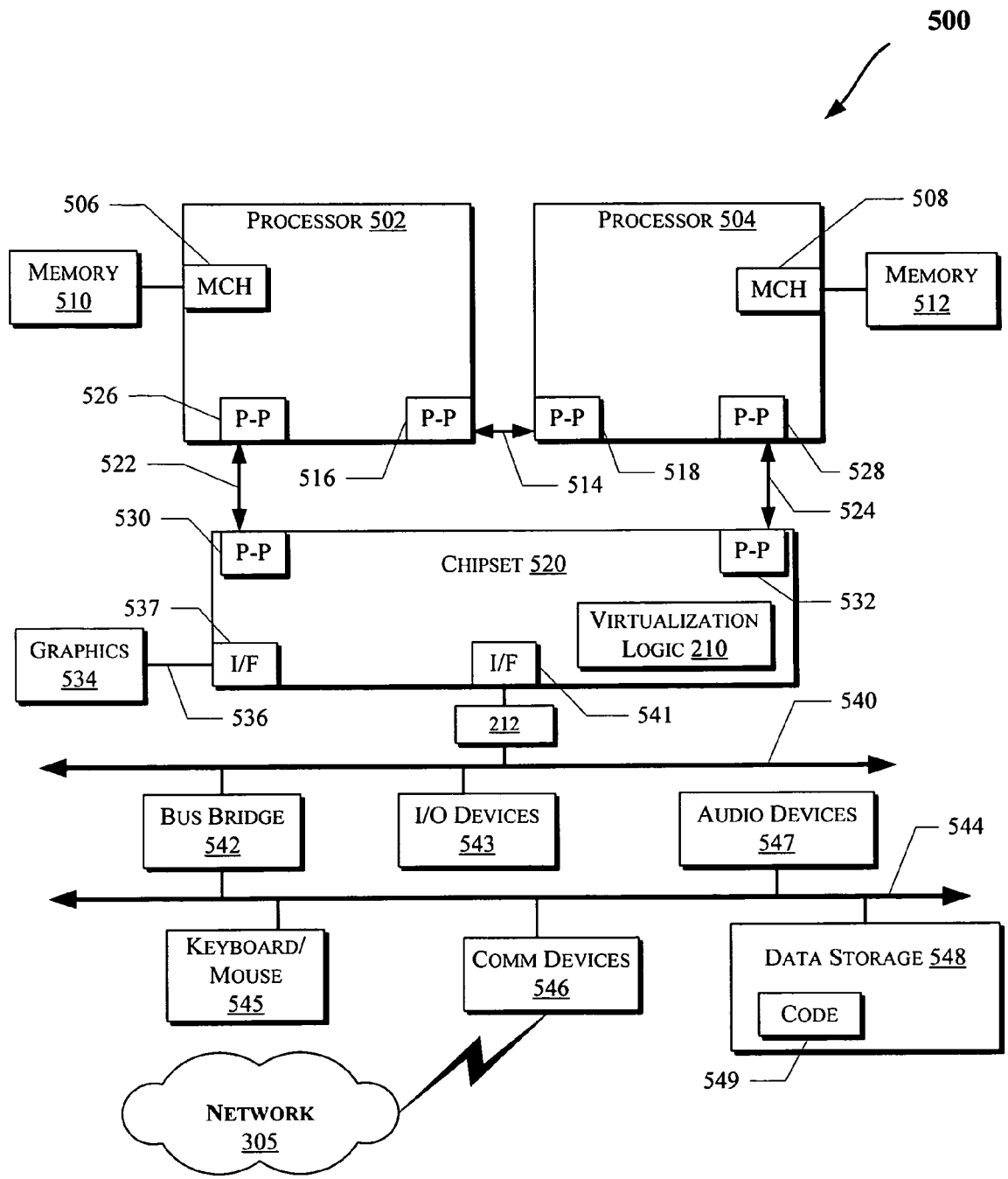

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 312 of FIG. 3. As shown in FIG. 5, the processors 502 and 504 may also include the cache(s) 513 discussed with reference to FIG. 5.

In an embodiment, the processors 502 and 504 may be one of the processors 302 discussed with reference to FIG. 3. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, the switching logic 212 may be coupled between the chipset 520 and other components of the system 500 such as those communicating via a bus 540. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 305), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a first hardware logic to decode a memory access request, from a peripheral device to an interface device, to determine whether a virtual address is identified by the memory access request; and
a second hardware logic to translate the virtual address into a physical address based on data stored in a cache, wherein the interface device is to comprise a third hardware logic to transmit an address translation completion packet, the address translation completion packet to comprise address translation data corresponding to a request by the peripheral device to translate one or more virtual addresses into one or more corresponding physical addresses.

2. The apparatus of claim 1, further comprising a fourth hardware logic to update a corresponding entry of the cache in accordance with the address translation data of the address translation completion packet.

3. The apparatus of claim 1, wherein the interface device comprises a fourth hardware logic to generate an address translation invalidation request.

4. The apparatus of claim 3, further comprising a fifth hardware logic to invalidate a corresponding entry of the cache in response to the address translation invalidation request.

5. The apparatus of claim 1, further comprising a fourth hardware logic to replace the virtual address in the memory access request with the physical address to provide an updated memory access request.

6. The apparatus of claim 5, wherein the fourth hardware logic is to transmit the updated memory access request to the interface device.

7. The apparatus of claim 1, further comprising a memory to store data in an entry that corresponds to the physical address.

8. The apparatus of claim 1, wherein one or more of the first hardware logic, the second hardware logic, one or more processor cores, or the cache are on a same integrated circuit die.

9. The apparatus of claim 1, wherein one or more of the first hardware logic, the second hardware logic, the interface device, or the cache are on a same integrated circuit die.

10. A method comprising:
receiving a memory access request transmitted from a peripheral device to an interface device;
determining whether the memory access request comprises a virtual address;
translating the virtual address into a corresponding physical address; and
transmitting an address translation completion packet, the address translation completion packet to comprise address translation data corresponding to a request by the peripheral device to translate one or more virtual addresses into one or more corresponding physical addresses.

11. The method of claim 10, further comprising replacing the virtual address in the memory access request with the physical address to provide an updated memory access request.

12. The method of claim 11, further comprising transmitting the updated memory access request to the interface device.

13. The method of claim 10, further comprising updating a cache based on one or more packets transmitted from the interface device to the device.

14. The method of claim 10, wherein the determining comprises decoding the memory access request.

15. The method of claim 10, wherein translating the virtual address into the corresponding physical address comprises accessing a cache.

16. A system comprising:
a storage unit to store a virtual address and a physical address corresponding to the virtual address; and
a switching hardware logic to receive a memory access request from an input/output (I/O) device and directed to a chipset to access a location within a system memory identified by a virtual address, the switching hardware logic to translate the virtual address into a corresponding physical address and to transmit an updated memory access request with the physical address to the chipset, wherein the chipset is to comprise hardware logic to transmit an address translation completion packet, the address translation completion packet to comprise address translation data corresponding to a request by the I/O device to translate one or more virtual addresses into one or more corresponding physical addresses.

17. The system of claim 16, wherein the switching hardware logic decodes the memory access request to determine an existence of the virtual address.

18. The system of claim 16, wherein the storage unit comprises a cache.

19. The system of claim 18, further comprising a cache update hardware logic to update one or more entries of the cache in accordance with one or more packets transmitted by the chipset.

20. The system of claim 16, wherein the memory access request comprises one or more of a memory read request or a memory write request.

21. The system of claim 16, wherein the chipset comprise a virtualization hardware logic to translate virtual addresses into physical addresses.

22. The system of claim 16, wherein the switching hardware logic is coupled to the I/O device and the chipset via a peripheral component interconnect.

23. The system of claim 16, further comprising an audio device coupled to the switching hardware logic.

* * * * *